(12) United States Patent
Wu

(10) Patent No.: US 12,277,331 B2
(45) Date of Patent: *Apr. 15, 2025

(54) DATA STORAGE DEVICE AND METHOD FOR DETERMINING BUFFER SIZE OF THE DATA STORAGE DEVICE

(71) Applicant: Silicon Motion, Inc., Hsinchu County (TW)

(72) Inventor: Po-Lin Wu, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 55 days.

This patent is subject to a terminal disclaimer.

(21) Appl. No.: 18/219,705

(22) Filed: Jul. 10, 2023

(65) Prior Publication Data

US 2024/0126463 A1 Apr. 18, 2024

(30) Foreign Application Priority Data

Oct. 18, 2022 (TW) .................................. 111139506

(51) Int. Cl.
*G06F 3/06* (2006.01)
*G06F 12/02* (2006.01)

(52) U.S. Cl.
CPC ............ *G06F 3/064* (2013.01); *G06F 3/0656* (2013.01); *G06F 12/0253* (2013.01); *G06F 3/0604* (2013.01); *G06F 3/0679* (2013.01)

(58) Field of Classification Search
None
See application file for complete search history.

(56) References Cited

U.S. PATENT DOCUMENTS 8,788,783 B1 * 7/2014 Karnati ................. G06F 12/084
711/170
9,209,949 B2 12/2015 Lee
(Continued)

FOREIGN PATENT DOCUMENTS

| CN | 101341471 B | 3/2011 |
| CN | 104903841 B | 1/2018 |
| CN | 115080457 A | 9/2022 |

OTHER PUBLICATIONS

Wu, the specification, including the claims, and drawings in the U.S. Appl. No. 18/219,101, filed Jul. 7, 2023.

*Primary Examiner* — Yaima Rigol
(74) *Attorney, Agent, or Firm* — Winston Hsu

(57) ABSTRACT

A data storage device includes a memory device and a memory controller. The memory device includes multiple memory blocks. The memory blocks includes one or more spare memory blocks that are not written with data and one or more predetermined memory blocks that are configured as a buffer for receiving data from a host device. The memory controller is coupled to the memory device and configured to access the memory device. The memory controller is configured to determine a setting value of a number of said one or more predetermined memory blocks according to a number of currently remaining spare memory block(s), a number of the predetermined memory block(s) that has/have been written with data among said one or more predetermined memory blocks and a predetermined threshold, and configure the number of the predetermined memory block(s) as the buffer according to the setting value.

10 Claims, 5 Drawing Sheets

(56) References Cited

U.S. PATENT DOCUMENTS

| | | | |
|---|---|---|---|
| 9,474,067 B2 | 10/2016 | Damnjanovic | |
| 9,996,462 B1* | 6/2018 | Lin | G11C 16/105 |
| 10,448,418 B2 | 10/2019 | Wang | |
| 11,412,406 B2 | 8/2022 | Mukherjee | |
| 2011/0119442 A1* | 5/2011 | Haines | G06F 12/0246 |
| | | | 711/170 |
| 2015/0003156 A1* | 1/2015 | Berckmann | G11C 29/04 |
| | | | 365/185.11 |
| 2015/0261671 A1* | 9/2015 | Chu | G06F 12/0246 |
| | | | 711/103 |
| 2016/0077968 A1* | 3/2016 | Sela | G06F 12/0246 |
| | | | 711/118 |
| 2016/0098350 A1* | 4/2016 | Tang | G06F 12/0871 |
| | | | 711/103 |
| 2017/0083444 A1* | 3/2017 | Dev | G06F 12/0871 |
| 2017/0257883 A1 | 9/2017 | Bessho | |
| 2017/0285954 A1* | 10/2017 | Fan | G06F 3/0619 |
| 2019/0013081 A1* | 1/2019 | Blodgett | H04L 9/0861 |
| 2019/0065080 A1* | 2/2019 | Tanpairoj | G06F 12/0246 |
| 2020/0192810 A1* | 6/2020 | Ke | G06F 12/0882 |
| 2021/0073119 A1* | 3/2021 | Amaki | G06F 3/0613 |

\* cited by examiner

US 12,277,331 B2

DATA STORAGE DEVICE AND METHOD FOR DETERMINING BUFFER SIZE OF THE DATA STORAGE DEVICE

BACKGROUND OF THE INVENTION

1. Field of the Invention

The invention relates to a method for determining a current write buffer size, more particularly to a method for accurately determining a current write buffer size.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes.

Usually, the data storage device configures a write buffer to receive data from the host. Configurations of the type and size of the write buffer will affect write speed of the data, and also affect arrangement of the data size in the write operation of writing data into the data storage device by the host, and finally affect the access performance of the data storage device. In addition, the access performance of the data storage device will dominate the user experience.

Therefore, how to accurately estimate or determine the current write buffer size that can be configured to avoid significant change in the write speed of the data as well as to maintain better user experience is a topic worthy of considering in the field of data storage.

SUMMARY OF THE INVENTION

It is an objective of the invention to provide a method for accurately determining a current write buffer size to avoid significant change in the write speed of the data as well as to maintain better user experience.

According to an embodiment of the invention, a data storage device comprises a memory device and a memory controller. The memory device comprises a plurality of memory blocks. The memory blocks comprise one or more spare memory blocks that are not written with data and one or more predetermined memory blocks that are configured as a buffer for receiving data from a host device. The memory controller is coupled to the memory device and configured to access the memory device. The memory controller is configured to determine a setting value of a number of said one or more predetermined memory blocks according to a number of currently remaining spare memory block(s), a number of the predetermined memory block(s) that has/have been written with data among said one or more predetermined memory blocks and a predetermined threshold, and configure the number of the predetermined memory block(s) as the buffer according to the setting value.

According to another embodiment of the invention, a method for determining buffer size of a data storage device which comprising a memory device and a memory controller, wherein the memory device comprises a plurality of memory blocks, the memory blocks comprise one or more spare memory blocks that are not written with data and one or more predetermined memory blocks that are configured as a buffer for receiving data from a host device, comprises: obtaining a number of currently remaining spare memory block(s); obtaining a number of the predetermined memory block(s) that has/have been written with data among said one or more predetermined memory blocks; determining a setting value of a number of said one or more predetermined memory blocks according to the number of currently remaining spare memory block(s), the number of the predetermined memory block(s) that has/have been written with data among said one or more predetermined memory blocks and a predetermined threshold; and configuring the number of the predetermined memory block(s) as the buffer according to the setting value.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
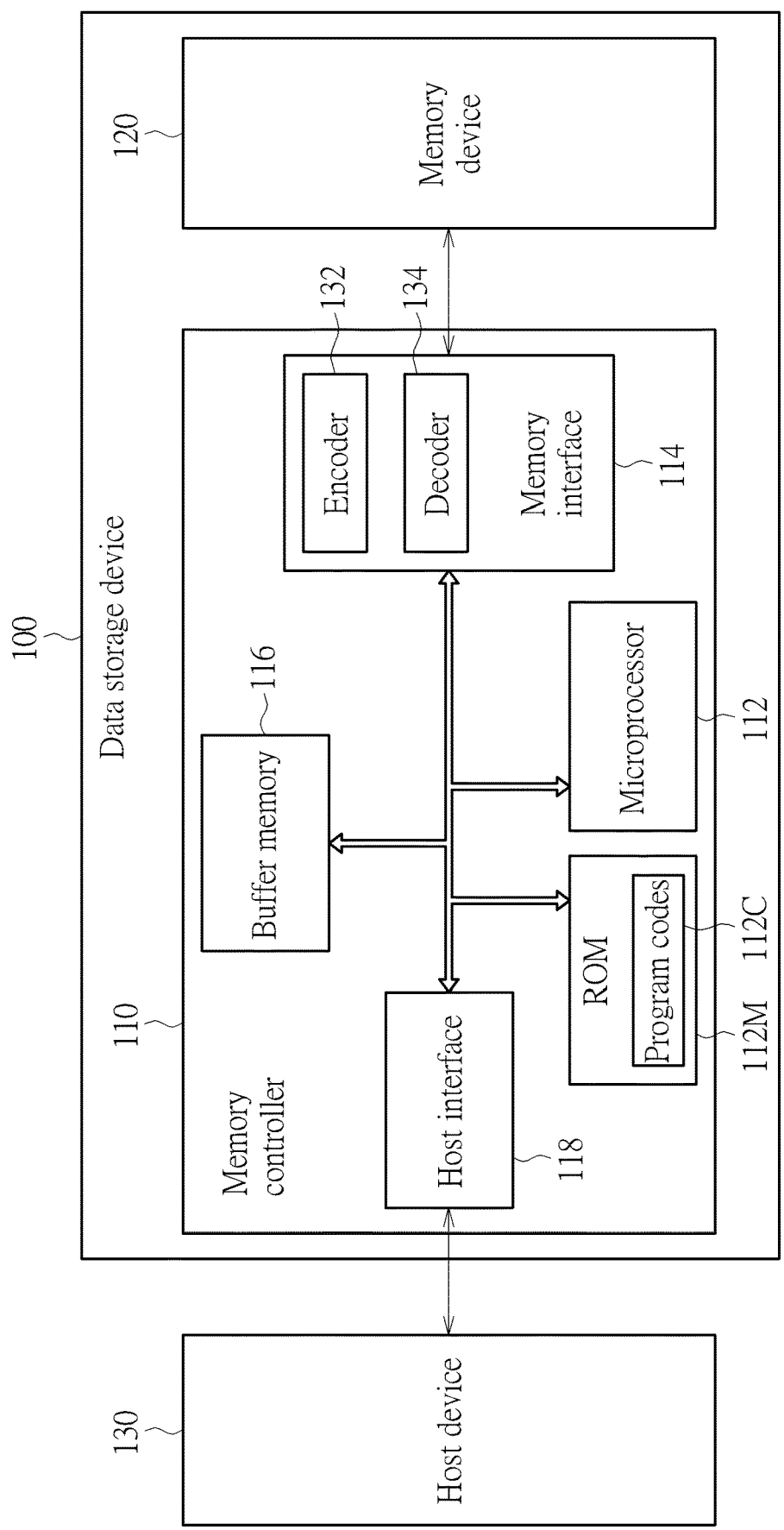
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

Generally, the memory controller 110 may configure one or more predetermined memory blocks as a cache memory, or called a buffer, or the predetermined memory blocks may also be named as the current blocks or active blocks, to receive data from the host device 130. The configured predetermined memory blocks may be Single-Level Cell (SLC) memory blocks, Multiple-Level Cell (MLC) memory blocks, Triple-Level Cell (TLC) memory blocks, or other types of memory blocks with further more levels. When the usage of the buffer reaches a certain level, the memory controller 110 may perform a flush operation to write the data stored in the buffer into another memory block (for example, to write the data stored in multiple SLC memory blocks into a TLC memory block), and labeled said another memory block as a data block in the user area or data area of the memory device 120, or, the memory controller 110 may directly update a memory block which has been utilized as the buffer to a data block in the user area or data area. In this manner, the memory space of the buffer can be released and used again in forthcoming operations.

In addition, the host device 130 may determine whether to activate a WriteBooster function at the data storage device 100 side. When the WriteBooster is activated, the memory controller 110 may configure the SLC blocks as the buffer to receive data from the host device 130. Since the speed of writing data in a SLC memory block is faster than the speed of writing data in other types of memory blocks (such as the MLC memory block, TLC memory block, or others), the write operation may be performed in a high-speed mode when using the SLC blocks as the buffer to receive data from the host device 130.

The host device 130 may issue corresponding commands to activate and control the WriteBooster function at the data storage device 100. As an example, the host device 130 may instruct the data storage device 100 to activate the WriteBooster function by issuing a command to set a corresponding flag or by issuing an activate WriteBooster command.

When the WriteBooster function is activated, the host device 130 may further issue a query command to the data storage device 100 to query the buffer size currently configured by the memory controller 110. For example, the host device 130 may query the data storage device 100 about the status of the WriteBooster by reading the corresponding attributes, wherein the attributes may comprise a current WriteBooster buffer size (Current_Write_Booster_Buffer_Size), an available WriteBooster buffer size (Available_Write_Booster_Buffer_Size), or others. Note that the buffer size configured by the memory controller 110 is not a fixed setting and may be dynamically adjusted by the memory controller 110.

Upon receiving the query command from the host device 130, the memory controller 110 may calculate, estimate or determine the current buffer size (as an example, by calculating or estimating a number of the predetermined memory blocks that are configurable as the buffer), and provide the calculation, estimation or determination result to the host device 130. The existing estimation method only considers the number of spare memory blocks in the memory device 120, wherein the spare memory blocks are the memory blocks that have been erased and are not yet written with data, and are not configured as the memory blocks for any other utilization. However, only considering the number of spare memory blocks will result in erroneous estimation after data has been written into the configured predetermined memory blocks, causing the host device 130 to fail to obtain accurate buffer size information. In addition, since the host device 130 arranges the subsequent write operation according to the obtained buffer size information, the incorrect buffer size information will further cause a significant change in the write speed of the data, which is an undesirable defect.

To solve the problems, a method for determining buffer size of a data storage device is proposed, to accurately calculate, estimate or determine the currently configurable write buffer size, and to avoid significant changes in the write speed of data.

Figure 2:
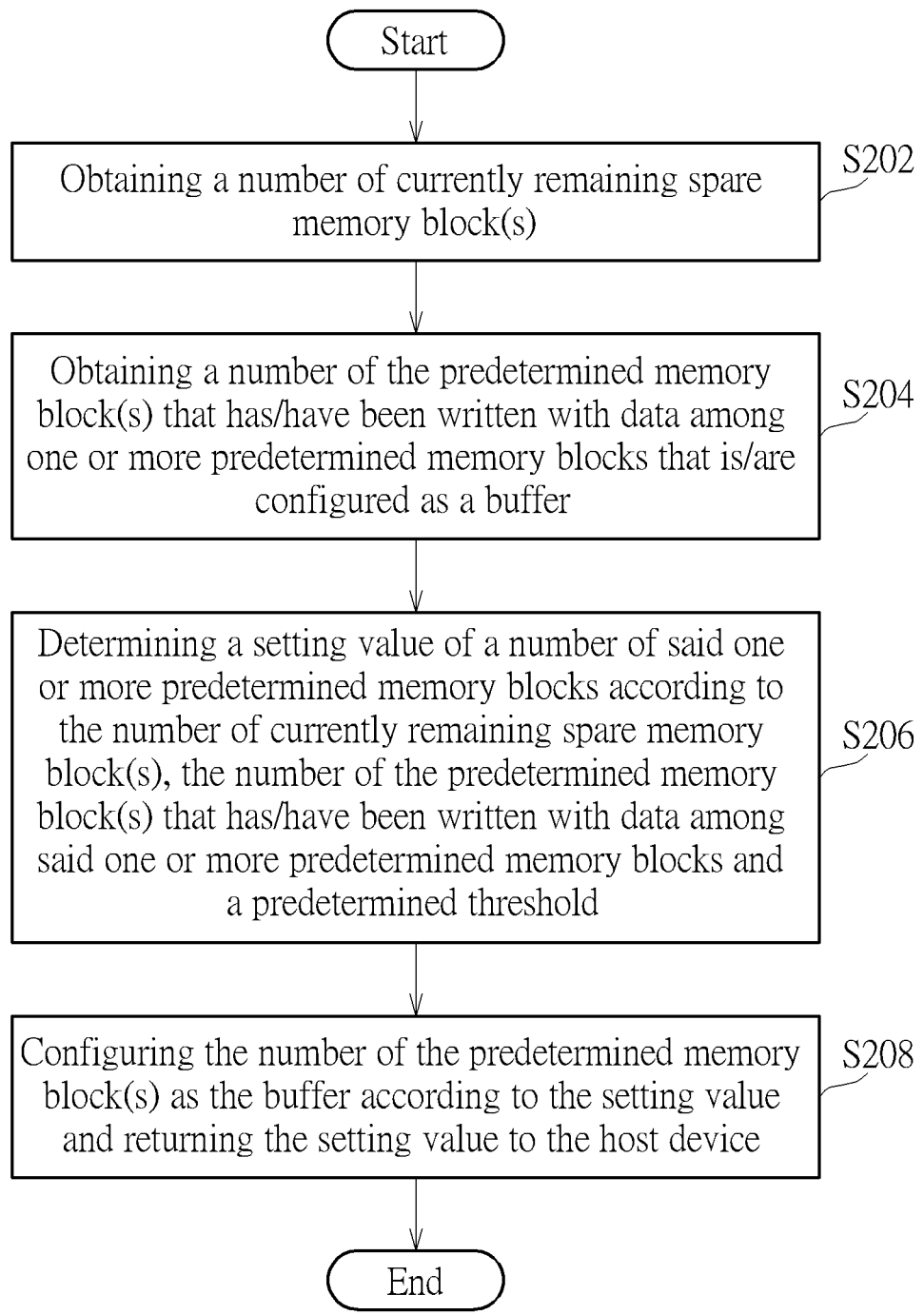
FIG. 2 shows a schematic flow chart of the method for determining buffer size of a data storage device according to an embodiment of the invention.

FIG. 2 shows a schematic flow chart of the method for determining buffer size of a data storage device according to an embodiment of the invention. The method may be performed by the memory controller 110 and may comprise the following steps:

Step S202: obtaining a number of currently remaining spare memory block(s).

Step S204: obtaining a number of the predetermined memory block(s) that has/have been written with data among said one or more predetermined memory blocks.

Step S206: determining a setting value of a number of said one or more predetermined memory blocks (i.e., a current or the latest setting value of the buffer size for the forthcoming configuration) according to the number of currently remaining spare memory block(s), the number of the predetermined memory block(s) that has/have been written with data among said one or more predetermined memory blocks and a predetermined threshold.

Step S208: configuring the number of the predetermined memory block(s) as the buffer according to the setting value.

In an embodiment of the invention, the flow of determining the buffer size as shown in FIG. 2 may be performed in response to the reception of the aforementioned query command issued by the host device 130, and after determining the setting value, the memory controller 110 may send the determined setting value back the host device 130.

In an embodiment of the invention, in step S206, the memory controller 110 may further determine a number of valid spare memory blocks according to the number of currently remaining spare memory block(s) and the number of the predetermined memory block(s) that has/have been written with data, and determine the setting value according to a difference between the number of valid spare memory blocks and the predetermined threshold.

To be more specific, in an embodiment of the invention, the number of valid spare memory blocks is a summation of the number of currently remaining spare memory block(s) and the number of the predetermined memory block(s) that has/have been written with data.

In addition, according to an embodiment of the invention, in step S206, the memory controller 110 may further determine whether the number of valid spare memory blocks is smaller than the predetermined threshold, wherein the predetermined threshold may be a minimum allowable number of spare memory blocks, or may be a threshold of a number of spare memory blocks for triggering a garbage collection (GC) procedure. To be more specific, in an embodiment of the invention, when the number of currently remaining spare memory block(s) is determined as being smaller than the predetermined threshold, the memory controller 110 may trigger the GC procedure to release the memory space of the memory blocks storing invalid data. After the GC procedure, the number of spare memory blocks may be increased.

In an embodiment of the invention, when the number of valid spare memory blocks is smaller than the predetermined threshold, the memory controller 110 may set the setting value as 0, and may send the setting value back the host device 130 in step S208. When the number of valid spare memory blocks is not smaller than (i.e., greater than or equal to) the predetermined threshold, the memory controller 110 may set the setting value as the difference between the number of valid spare memory blocks and the predetermined threshold, to avoid triggering the GC procedure during the reception of the data from the host device 130 due to insufficient spare memory blocks.

Figure 3:
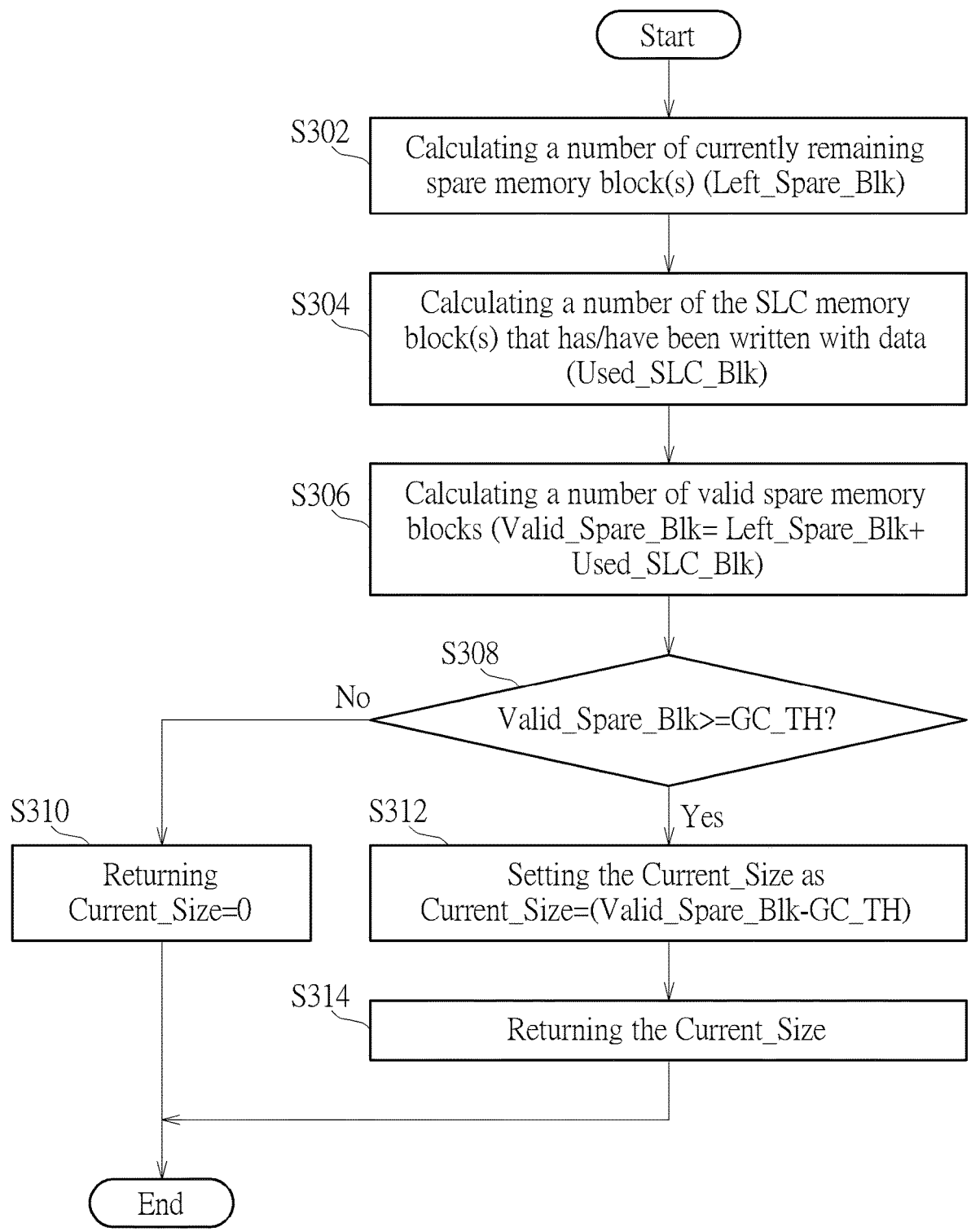
FIG. 3 shows a detailed flow chart of the method for determining buffer size of a data storage device according to a first embodiment of the invention.

FIG. 3 shows a detailed flow chart of the method for determining buffer size of a data storage device according to a first embodiment of the invention. In the exemplary flow chart shown in FIG. 3, the WriteBooster function is activated and therefore, the predetermined memory blocks configured as the buffer are the SLC memory blocks, and proposed method for determining buffer size may be performed by the memory controller 110 in response to the reception of the query command issued by the host device 130 and may comprise the following steps:

Step S302: calculating or obtaining a number of currently remaining spare memory block(s) (also named as left spare memory block(s)) (e.g., Left_Spare_Blk). The memory controller 110 may calculate the number of currently remaining spare memory block(s) according to some relative values recorded by itself, or may obtain the information regarding the number of currently remaining spare memory block(s) by reading a counting value for counting or recording the number of currently left or remaining spare memory block(s).

Step S304: calculating or obtaining a number of the SLC memory block(s) that has/have been written with data (also named as the used SLC memory blocks) (e.g., Used_SLC_Blk) among the one or more SLC memory blocks that are configured as the buffer. The memory controller 110 may calculate the number of SLC memory block(s) that has/have been written with data according to some relative values recorded by itself, or may obtain the information regarding the number of currently remaining spare memory block(s) by reading a counting value for counting or recording the number of SLC memory block(s) that has/have been written with data.

Step S306: calculating a number of valid spare memory blocks Valid_Spare_Blk. The memory controller may add the number of currently remaining spare memory block(s) Left_Spare_Blk to the number of SLC memory block(s) that has/have been written with data Used_SLC_Blk to obtain the number of valid spare memory blocks Valid_Spare_Blk. When being expressed in a formula, the calculation is expressed as (Valid_Spare_Blk=Left_Spare_Blk+Used_SLC_Blk). Since the predetermined memory blocks (in this embodiment are the SLC memory blocks) that have been written with data may undergo the aforementioned flush operation so that the data stored therein will be collected and rewritten into another memory block (such as an TLC memory block), or the data stored in the predetermined memory blocks may be discarded after unmapping the data with the predetermined memory blocks (for example, when the data becomes invalid data), the predetermined memory blocks may be released and may be reused as spare memory blocks. Therefore, when calculating the number of valid spare memory blocks Valid_Spare_Blk, the summation of the number of currently remaining spare memory block(s) Left_Spare_Blk and the number of SLC memory block(s) that has/have been written with data Used_SLC_Blk may be taken as the number of valid spare memory blocks Valid_Spare_Blk.

Step S308: determining whether the number of valid spare memory blocks Valid_Spare_Blk is greater than or equal to a predetermined threshold, as an example, a threshold GC_TH of a number of spare memory blocks that will trigger a GC procedure. If the determination result shows no, it means that the number of valid spare memory blocks Valid_Spare_Blk is smaller than the predetermined threshold and step S310 is performed. If the determination result shows yes, it means that the number of valid spare memory blocks Valid_Spare_Blk is not smaller than the predetermined threshold and step S312 is performed.

Step S310: setting the setting value as 0. When being expressed in a formula, the operation is expressed as Current_Size=0, where value of the parameter Current_Size is the currently determined WriteBooster buffer size. Therefore, the WriteBooster buffer size currently determined by memory controller 110 is 0, and the determined value will be sent back to the host device 130.

Step S312: setting the setting value as the difference between the number of valid spare memory blocks and the predetermined threshold. When being expressed in a formula, the operation is expressed as Current_Size=(Valid_Spare_Blk−GC_TH). Therefore, the WriteBooster buffer size currently determined by memory controller 110 is (Valid_Spare_Blk−GC_TH).

Step S314: sending the determined value (that is, the setting value (i.e., the Current_Size)) back to the host device 130.

By implementing the proposed method for determining buffer size, the currently configurable write buffer size is accurately calculated, estimated or determined, so as to avoid significant changes in the write speed of data.

In the second embodiment of the invention, when determining the buffer size, the memory controller may further consider a total number of remaining erasable count of the memory blocks of the data storage device 100, so as to provide better protection for the data storage device 100 after the data storage device 100 has been used for a period of time.

Figure 4:
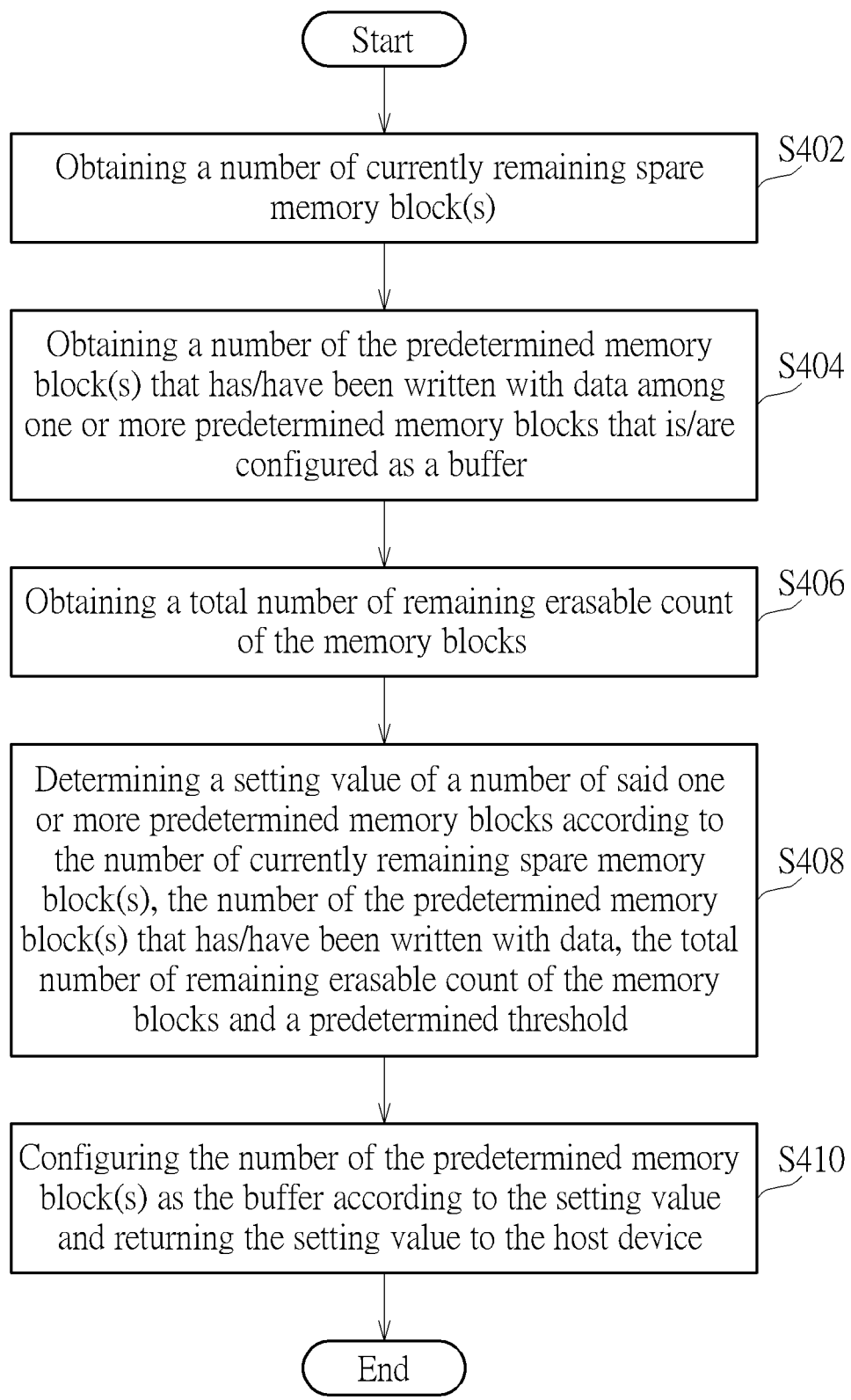
FIG. 4 shows a schematic flow chart of the method for determining buffer size of a data storage device according to a second embodiment of the invention.

FIG. 4 shows a schematic flow chart of the method for determining buffer size of a data storage device according to a second embodiment of the invention. The method may be performed by the memory controller 110 and may comprise the following steps:

Step S402: obtaining a number of currently remaining spare memory block(s).

Step S404: obtaining a number of the predetermined memory block(s) that has/have been written with data among said one or more predetermined memory blocks.

Step S406: obtaining a total number of remaining erasable count of the memory blocks of the data storage device 100.

Step S408: determining a setting value of a number of said one or more predetermined memory blocks (i.e., a current or the latest setting value of the buffer size) according to the number of currently remaining spare memory block(s), the number of the predetermined memory block(s) that has/have been written with data among said one or more predetermined memory blocks, the total number of remaining erasable count of the memory blocks and a predetermined threshold.

Step S410: configuring the number of the predetermined memory block(s) as the buffer according to the setting value.

In an embodiment of the invention, the flow of determining the buffer size as shown in FIG. 4 may be performed in response to the reception of the aforementioned query command issued by the host device 130, and after determining the setting value, the memory controller 110 may send the determined setting value back the host device 130.

According to an embodiment of the invention, the memory controller 110 may record an erase count Erase_Cnt for each memory block, and may sum up the erase count Erase_Cnt of all memory blocks of the data storage device 100 to obtain a total number of erase count of the memory blocks corresponding to the data storage device 100. In addition, the memory controller 110 may further record an upper limit of the total number of erase count, which may be a value set according to customer requirements, to represent the upper limit of the total number of allowable erase count for the data storage device 100, and the value of upper limit may be written into the ROM 112M during the manufacturing process. The memory controller 110 may subtract the currently obtained total number of erase count of the memory blocks corresponding to the data storage device 100 from the upper limit of the total number of erase count, thereby obtaining the total number of remaining erasable count of the memory blocks of the data storage device 100 (also named as the left erasable count, e.g., Left_Erase_Cnt).

In addition, according to an embodiment of the invention, in step S408, the memory controller 110 may further determine a number of valid spare memory blocks according to the number of currently remaining spare memory block(s) and the number of the predetermined memory block(s) that has/have been written with data, and determine the setting value (which may be a preliminary setting value) according to a difference between the number of valid spare memory blocks and the predetermined threshold.

To be more specific, in an embodiment of the invention, the number of valid spare memory blocks is a summation of the number of currently remaining spare memory block(s) and the number of the predetermined memory block(s) that has/have been written with data.

In addition, according to an embodiment of the invention, in step S408, the memory controller 110 may further determine whether the number of valid spare memory blocks is smaller than the predetermined threshold, wherein the predetermined threshold may be a minimum allowable number of spare memory blocks, or may be a threshold of a number of spare memory blocks for triggering a garbage collection (GC) procedure.

In an embodiment of the invention, when the number of valid spare memory blocks is smaller than the predetermined threshold, the memory controller 110 may set the setting value as 0, and may send the setting value back the host device 130 in step S410. When the number of valid spare memory blocks is not smaller than (i.e., greater than or equal to) the predetermined threshold, the memory controller 110 may set the setting value as the difference between the number of valid spare memory blocks and the predetermined threshold, to avoid triggering the GC procedure during the reception of the data from the host device 130 due to insufficient spare memory blocks.

In addition, in step S408, the memory controller 110 may further determine whether to modify the setting value according to the total number of remaining erasable count Left_Erase_Cnt. When the total number of remaining erasable count Left_Erase_Cnt is not smaller than the setting value, the memory controller 110 may determine not to modify the setting value. When the total number of remaining erasable count Left_Erase_Cnt is smaller than the setting value, the memory controller 110 may modify the setting value to a value of the total number of remaining erasable count Left_Erase_Cnt, so as to prevent the total number of erase count of the memory blocks corresponding to the data storage device 100 from exceeding the upper limit of the total number of allowable erase count. It is to be noted that, since the memory controller 110 performs the erase operations on the memory device 120 in units of memory blocks, the total number of remaining erasable count Left_Erase_Cnt may be regarded as the number of memory blocks than can still be erased at present.

Figure 5:
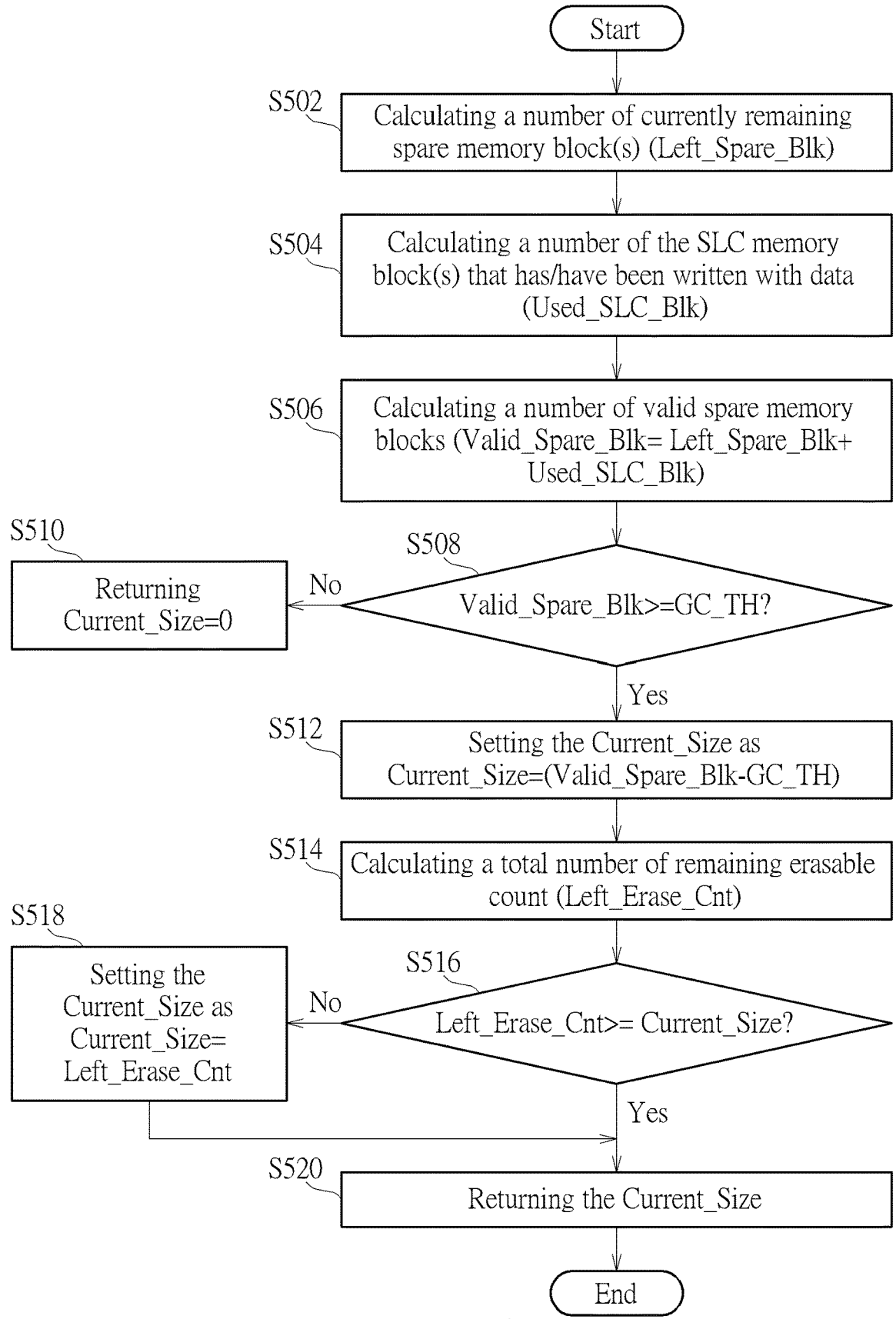
FIG. 5 shows a detailed flow chart of the method for determining buffer size of a data storage device according to a second embodiment of the invention.

FIG. 5 shows a detailed flow chart of the method for determining buffer size of a data storage device according to a second embodiment of the invention. In the exemplary flow chart shown in FIG. 5, the WriteBooster function is activated and therefore, the predetermined memory blocks configured as the buffer are the SLC memory blocks, and proposed method for determining buffer size may be performed by the memory controller 110 in response to the reception of the query command issued by the host device 130 and may comprise the following steps:

Step S502: calculating or obtaining a number of currently remaining spare memory block(s) (e.g., the Left_Spare_Blk). The memory controller 110 may calculate the number of currently remaining spare memory block(s) according to some relative values recorded by itself, or may obtain the information regarding the number of currently remaining spare memory block(s) by reading a counting value for counting or recording the number of currently left or remaining spare memory block(s).

Step S504: calculating or obtaining a number of the SLC memory block(s) that has/have been written with data (e.g., the Used_SLC_Blk) among one or more SLC memory blocks configured as the buffer. The memory controller 110 may calculate the number of SLC memory block(s) that has/have been written with data according to some relative values recorded by itself, or may obtain the information regarding the number of currently remaining spare memory block(s) by reading a counting value for counting or recording the number of SLC memory block(s) that has/have been written with data.

Step S506: calculating a number of valid spare memory blocks Valid_Spare_Blk. The memory controller may add the number of currently remaining spare memory block(s) Left_Spare_Blk to the number of SLC memory block(s) that has/have been written with data Used_SLC_Blk to obtain the number of valid spare memory blocks Valid_Spare_Blk. When being expressed in a formula, the calculation is expressed as (Valid_Spare_Blk=Left_Spare_Blk+Used_SLC_Blk). Since the predetermined memory blocks (in this embodiment are the SLC memory blocks) that have been written with data may undergo the aforementioned flush operation so that the data stored therein will be collected and rewritten into another memory block (such as an TLC memory block), or the data stored in the predetermined memory blocks may be discarded after unmapping the data with the predetermined memory blocks (for example, when the data becomes invalid data), the predetermined memory blocks may be released and may be reused as spare memory blocks. Therefore, when calculating the number of valid spare memory blocks Valid_Spare_Blk, the summation of the number of currently remaining spare memory block(s) Left_Spare_Blk and the number of SLC memory block(s) that has/have been written with data Used_SLC_Blk may be taken as the number of valid spare memory blocks Valid_Spare_Blk.

Step S508: determining whether the number of valid spare memory blocks Valid_Spare_Blk is greater than or equal to a predetermined threshold, as an example, a threshold GC_TH of a number of spare memory blocks that will trigger a GC procedure. If the determination result shows no, it means that the number of valid spare memory blocks Valid_Spare_Blk is smaller than the predetermined threshold and step S510 is performed. If the determination result shows yes, it means that the number of valid spare memory blocks Valid_Spare_Blk is not smaller than the predetermined threshold and step S512 is performed.

Step S510: setting the setting value as 0. When being expressed in a formula, the operation is expressed as Current_Size=0, where value of the parameter Current_Size is the currently determined WriteBooster buffer size. Therefore, the WriteBooster buffer size currently determined by memory controller 110 is 0, and the determined value will be sent back to the host device 130.

Step S512: setting the setting value as the difference between the number of valid spare memory blocks and the predetermined threshold. When being expressed in a formula, the operation is expressed as Current_Size=(Valid_Spare_Blk−GC_TH).

Step S514: calculating or obtaining a total number of remaining erasable count (e.g., Left_Erase_Cnt). As described above, the memory controller 110 may subtract the currently obtained total number of erase count of the memory blocks corresponding to the data storage device 100 from the upper limit of the total number of erase count to obtain the total number of remaining erasable count Left_Erase_Cnt of the memory blocks of the data storage device 100.

Step S516: determining whether the total number of remaining erasable count Left_Erase_Cnt is greater than the setting value obtained in step S512. If the determination shows no, it means that the total number of remaining erasable count Left_Erase_Cnt is smaller than the setting value (i.e., Left_Erase_Cnt<Current_Size), steps S518 of modifying the setting value and step S520 are performed. If the determination shows yes, it means that the total number of remaining erasable count Left_Erase_Cnt is not smaller than the setting value (i.e., Left_Erase_Cnt>=Current_Size), the memory controller 110 does not modify the setting value and directly perform step S520. Therefore, when the total number of remaining erasable count Left_Erase_Cnt is not smaller than the setting value, the WriteBooster buffer size currently determined by memory controller 110 is still (Valid_Spare_Blk−GC_TH).

Step S518: modifying the setting value as a value of the total number of remaining erasable count of the memory blocks. When being expressed in a formula, the operation is expressed as (Current_Size=Left_Erase_Cnt). Therefore, the WriteBooster buffer size currently determined by memory controller 110 is the value of the total number of remaining erasable count Left_Erase_Cnt.

Step S520: sending the determined value (that is, the setting value Current_Size) back to the host device 130.

In summary, by implementing the proposed method for determining buffer size, the currently configurable write buffer size is accurately calculated, estimated or determined, so as to avoid significant changes in the write speed of data. In addition, in some embodiments of the invention, when determining the buffer size, the memory controller may further consider a total number of remaining erasable count of the memory blocks of the data storage device 100, so as to provide better protection for the data storage device 100 after the data storage device 100 has been used for a period of time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
   a memory device, comprising a plurality of memory blocks, wherein the plurality of memory blocks comprise one or more spare memory blocks that are not written with data and one or more predetermined memory blocks that are configured as a buffer for receiving data from a host device; and
   a memory controller, coupled to the memory device and configured to access the memory device, wherein the memory controller is configured to determine a setting value of a number of the one or more predetermined memory blocks according to a number of the one or more spare memory blocks, a number of the predetermined memory block(s) that has/have been written with data among the one or more predetermined memory blocks and a predetermined threshold, and configure the number of the one or more predetermined memory blocks as the buffer according to the setting value, wherein the memory controller is further configured to determine a summation of the number of the one or more spare memory blocks and the number of the predetermined memory block(s) that has/have been written with data, and determine the setting value according to a difference between the summation and the predetermined threshold.

2. The data storage device of claim 1, wherein in response to the summation being smaller than the predetermined threshold, the memory controller sets the setting value as 0.

3. The data storage device of claim 1, wherein in response to the summation being not smaller than the predetermined threshold, the memory controller sets the setting value as the difference between the summation and the predetermined threshold.

4. The data storage device of claim 1, wherein the predetermined threshold is a minimum allowable number of spare memory blocks.

5. The data storage device of claim 1, wherein the predetermined threshold is a threshold of a number of the one or more spare memory blocks for triggering a garbage collection procedure.

6. A method for determining buffer size of a data storage device which comprising a memory device and a memory controller, wherein the memory device comprises a plurality of memory blocks, the plurality of memory blocks comprise one or more spare memory blocks that are not written with data and one or more predetermined memory blocks that are configured as a buffer for receiving data from a host device, the method comprises:
   obtaining a number of the one or more spare memory blocks;
   obtaining a number of the predetermined memory block(s) that has/have been written with data among the one or more predetermined memory blocks;
   determining a setting value of a number of the one or more predetermined memory blocks according to the number of the one or more spare memory blocks, the number of the predetermined memory block(s) that has/have been written with data among the one or more predetermined memory blocks and a predetermined threshold; and
   configuring the number of the one or more predetermined memory blocks as the buffer according to the setting value,
   wherein step of determining the setting value of the number of the one or more predetermined memory blocks according to the number of the one or more spare memory blocks, the number of the predetermined memory block(s) that has/have been written with data among-the one or more predetermined memory blocks and the predetermined threshold further comprises:
   determining a summation of the number of the one or more spare memory blocks and the number of the predetermined memory block(s) that has/have been written with data; and
   determining the setting value according to a difference between the summation and the predetermined threshold.

7. The method of claim 6, wherein step of determining the setting value according to the difference between the summation and the predetermined threshold further comprises:
   determining whether the summation is smaller than the predetermined threshold; and
   setting the setting value as 0 in response to the summation being smaller than the predetermined threshold.

8. The method of claim 6, wherein step of determining the setting value according to the difference between the summation and the predetermined threshold further comprises:
   setting the setting value as the difference between the summation and the predetermined threshold in response to the summation being not smaller than the predetermined threshold.

9. The method of claim 6, wherein the predetermined threshold is a minimum allowable number of spare memory blocks.

10. The method of claim 6, wherein the predetermined threshold is a threshold of a number of the one or more spare memory blocks for triggering a garbage collection procedure.

\* \* \* \* \*